(12) United States Patent
Thijssen et al.

(10) Patent No.: US 8,995,119 B2
(45) Date of Patent: Mar. 31, 2015

(54) LOW COST HIGH PERFORMANCE INJECTION MOLDED HARD DRIVE TOP COVER

(75) Inventors: Hendrikus Thijssen, Singapore (SG); Sudarshan Narasimhan, Bangkok (TH)

(73) Assignee: MMI Precision Forming Pte Ltd., Singapore (SG)

(*) Notice: Subject to any disclaimer, the term of this patent is extended or adjusted under 35 U.S.C. 154(b) by 32 days.

(21) Appl. No.: 13/203,099

(22) PCT Filed: Mar. 17, 2009

(86) PCT No.: PCT/SG2009/000093
§ 371 (c)(1),
(2), (4) Date: Dec. 16, 2011

(87) PCT Pub. No.: WO2010/107388
PCT Pub. Date: Sep. 23, 2010

(65) Prior Publication Data
US 2012/0092824 A1      Apr. 19, 2012

(51) Int. Cl.
| H05K 5/00 | (2006.01) |
| H05K 7/00 | (2006.01) |
| A47B 81/00 | (2006.01) |
| G11B 25/04 | (2006.01) |
| B29C 45/14 | (2006.01) |
| G11B 33/12 | (2006.01) |
| G11B 33/14 | (2006.01) |
| B29K 705/00 | (2006.01) |

(52) U.S. Cl.
CPC ........ *G11B 25/043* (2013.01); *B29C 45/14631* (2013.01); *G11B 33/123* (2013.01); *G11B 33/1446* (2013.01); *B29C 2045/14327* (2013.01); *B29K 2705/00* (2013.01)

USPC ........... 361/679.33; 361/679.34; 361/679.35; 361/679.36; 312/223.2

(58) Field of Classification Search
USPC ................. 361/679.31–679.4, 679.55–679.6, 361/724–727; 439/60, 151–160, 327, 328, 439/331, 638; 369/75.11, 75.21, 76, 77.11, 369/77.21, 78, 79, 80, 81, 82, 274, 369/275.1–275.5
See application file for complete search history.

(56) References Cited

U.S. PATENT DOCUMENTS

| 5,557,142 A * | 9/1996 | Gilmore et al. ............... 257/659 |
| 6,023,392 A | 2/2000 | Kim |
| 6,407,879 B1 | 6/2002 | Fruge' et al. |
| 6,469,864 B2 | 10/2002 | Kamezawa et al. |
| 6,473,263 B2 | 10/2002 | Jang et al. |
| 6,493,180 B1 | 12/2002 | Kang et al. |

(Continued)

*Primary Examiner* — Jerry Wu
(74) *Attorney, Agent, or Firm* — McAndrews Held & Malloy (57) ABSTRACT

Provided herein is a low cost high performance light weight hard drive cover that is injection molded. The hard drive top cover has a flange portion that applies pressure to an elastomeric seal preventing ingress of moisture dust and other contaminants into the sensitive components. The flange portion is reinforced with a plurality of metallic strips that are placed between pressure application locations embedded within the polymer flange. The viscoelastic creep response of the polymer flange does not contribute to relaxation of pressure on the elastomeric seal due to the presence of the metallic reinforcement strips. The metallic reinforcement strips may have a convex curvature between pressure application locations. The metallic reinforcement strip may have apertures for passage of injection molded polymer creating delamination free intimate bond between the polymer in the flange and the metallic reinforcement strip.

9 Claims, 5 Drawing Sheets

(56) References Cited

U.S. PATENT DOCUMENTS

| | | |
|---|---|---|
| 6,525,931 B2 | 2/2003 | Yagenji et al. |
| 6,560,063 B1 | 5/2003 | Keffeler et al. |
| 6,567,237 B2 | 5/2003 | Iwahara et al. |
| 6,876,515 B2 | 4/2005 | Unno |
| 6,900,961 B1 | 5/2005 | Butler |
| 6,950,275 B1 | 9/2005 | Ali et al. |
| 7,000,309 B1 | 2/2006 | Klassen et al. |
| 7,082,011 B2 | 7/2006 | Nakamura |
| 7,292,406 B1 | 11/2007 | Huang |
| 7,301,725 B2 | 11/2007 | Kim et al. |
| 7,385,784 B1 | 6/2008 | Berding et al. |
| 7,420,771 B1 | 9/2008 | Hanke et al. |
| 7,428,122 B2 | 9/2008 | Kimura et al. |
| 7,450,338 B2 | 11/2008 | Hur |
| 2001/0015869 A1* | 8/2001 | Kamezawa et al. ......... 360/97.01 |
| 2002/0196724 A1* | 12/2002 | Henrichs ...................... 369/75.1 |
| 2004/0012880 A1* | 1/2004 | Unno .......................... 360/97.01 |
| 2009/0257189 A1* | 10/2009 | Wang et al. .............. 361/679.56 |

* cited by examiner

LOW COST HIGH PERFORMANCE INJECTION MOLDED HARD DRIVE TOP COVER

The present application is filed pursuant to 35 U.S.C. 371 as a U.S. National Phase application of International Patent Application No. PCT/SG2009/000093, which was filed Mar. 17, 2009. The entire text of the aforementioned application is incorporated herein by reference in its entirety.

TECHNICAL FIELD

The present invention generally relates to a low cost injection molded polymeric cover that is reinforced at its sealing periphery applying reliable non relaxing pressure to seal element excluding dust from critical components.

BACKGROUND

A number of prior art patents relate to hard drive covers. Few of these patents use polymeric hard disk cover. Since polymers are generally viscoelastic bodies, the force applied by screws in clamping the hard disk top cover against a seal on bottom base member thereby applying sealing pressure. However, the seal pressure relaxes between the screws locations due to viscoelastic creep thereby relieving the sealing pressure.

U.S. Pat. No. 6,023,392 to Kim discloses a hard disk drive cover having improved structural and production characteristics. The hard disk drive cover is constructed using plastic resin that is injection molded to form the cover. A reinforcing frame is inserted inside the injection molded cover. The reinforcing frame has a plurality of stainless steel elongated bands that extend radically outward to engage a plurality of edges of the cover during injection molding of the polymer cover. Each of the elongated bands has a perforation in a distal end to fasten and engage with the base of the hard drive. Thus, the polymeric injection molded top cover is reinforced with radial stainless steel reinforcing bands. The bands do not reinforce the locations between the screws that affix the top cover to the hard drive base and the gasket in these portions will not receive adequate compression to provide an effective seal.

U.S. Pat. No. 6,407,879 to Fruge', et al. discloses disk drive cover features for spindle resonance tuning and damping. The disk drive has spindle resonance tuning and damping features for improved disk drive performance. The disk drive has slots in the top cover which reduces rocking resonant frequency of the spindle to allow a previously interacting spindle to no longer interact. A constrained-layer damper can be added over the top cover to dampen existing or interacting frequencies, which can further improve performance. This disk cover is provided with a plurality of circular shaped slots in between the spindle location and the periphery of the disk drive cover and the presence of slots prevents coupling of vibrations between the spindle vibrations and vibrations of the top cover thereby preventing resonance amplification. The disk drive top cover may be selected from the group consisting of plastic, aluminum or stainless steel. There are no stiffeners in the disk drive top cover plate between the bolt retaining locations.

U.S. Pat. No. 6,469,864 to Kamezawa, et al. discloses a disk drive having a resin cover improved in electromagnetic protection characteristics. A disk drive includes a housing having a base and a cover fixed to the base. A rotatable disk is mounted in the housing and having a plurality of tracks, a head for reading/writing data on the disk, and an actuator for moving the head across the tracks of the disk. The cover is composed of a molded resin and a metal sheet integrally embedded in the molded resin. The cover is composed of molded resin with a copper or steel metal sheet or mesh integrally embedded within the resin. The metal sheet has a majority of both the upper surface and a lower surface covered by the molded resin of the cover. The cover is secured to the base by a plurality of screws and the metal sheet embedded in the cover is exposed at portions where said screws are located. The screws contact both the metal sheet and the base to providing electromagnetic protection. The metal sheet used is a thin sheet of metal or mesh provided for electromagnetic protection and extends the entire top cover of the hard drive, not just the flange. Being a thin sheet or mesh, it does not provide any significant rigidity to the flange portion of the top cover improving seal performance.

U.S. Pat. No. 6,473,263 to Jung et al. discloses a cover structure of hard disk drive with air damping layer. The cover structure of a hard disk drive (HDD) can optimally suppress noises and vibrations generated in the HDD. The top cover of the disk drive has a damper attached there to with an air gap between the top cover and the damper. The air gap is indicated to provide better damping of spindle generated vibrations. The flange of the top cover does not have metallic reinforcement and the top cover is not indicated to be made from injection molded plastic.

U.S. Pat. No. 6,493,180 to Kang, et al. discloses a hard disk drive cover that contains a Helmholtz resonator which attenuates acoustic energy. A disk drive housing is provided with Helmholtz resonator that can attenuate noise. The housing may include a first layer that is attached to a second layer, and a gap located between the first and second layers. The layers and gap may be configured to attenuate acoustic energy within a relatively broad frequency range. This is a conventional hard drive housing that has its base portion and top portion made as two layers with a gap there between forming a Helmholz attenuator. The top cover or the hard drive is not made from injection molded plastic.

U.S. Pat. No. 6,525,931 to Yagenji, et al. discloses a cover for a hard disk drive. This cover for the hard drive is a laminated two metal plate structure that entirely contains a vibration absorbing resin. The resin prevented from leaking out by bent edges provided in the laminated metal plate structure. At the screw locations, the hole in the marginal (top) plate has bent edges so as to encase the gel. The sealing member contacts the bottom portion of the laminated top plate. The sealing member has nothing to do with the vibration absorbing gel contained within the laminated plate structure. The laminated plates are made from metal and are not formed from injection molded polymer.

U.S. Pat. No. 6,560,063 to Keffeler, et al. discloses a top cover for disk drive having stiffening features and gasket clearance enhancements. The top cover for the disk drive has a skirt that protrudes downward perpendicular to the flange providing increased stiffness, The skirt also creates a space between the bottom plate edge and the protrusion. This space is available for expansion of a compressed gasket that is used for sealing the bottom and top portions of the hard disk drive. All the components are made from metal and the top cover is not made from injection molded polymer.

U.S. Pat. No. 6,567,237 to Iwahara, et al. discloses a sound reducing cover seal for information recording apparatus. The cover seal seals an opening of a housing body and encloses a cover for the opening in cooperation with the housing body. The rigidity of the cover seal is reinforced by a metallic sheet or a multiplayer synthetic resin sheet, so that vibration of the cover seal is prevented even if an air stream between the housing body cover acts on the cover seal from behind. The sound is attenuated by a top cover, which is adhered to the top lid of the hard drive. The hard drive cover is not made from injection molded polymer.

U.S. Pat. No. 6,876,515 to Unno discloses a monolithically constituted gasket assembly with cover and hard disk drive unit. A hard disk drive unit constituted in the following manner can prevent leaks of gas caused by a deformed gasket assembly. The hard drive gasket assembly can enhance operational performances of the hard disk drive unit and can be assembled more easily. The top cover for the hard drive is indicated to be made from aluminum, plastic and the like and has holes in predetermined locations for inserting a gasket, which seals the cover against the base. No bolt or loading structure is indicated to retain the gasket in sealing compression. A ring projection iron protrudes against the base and the gasket also contacts the seal ring. This '515 patent does not address proper loading of the gasket providing a reliable seal.

U.S. Pat. No. 6,900,961 to Butler discloses a disk drive having a head disk assembly enclosure including insert molded components. The disk drive has an injection molded head disk assembly enclosure including insert molded components. A pivot is insert molded into the base. A first portion of a spindle motor is insert molded into the base. A second portion of a spindle motor is attached to the first portion to form the spindle motor. Further, a disk is mounted to the spindle motor and a head stack assembly having a coil portion is pivotally coupled to the pivot. No insert molded reinforcement is provided at the flange.

U.S. Pat. No. 6,950,275 to Ali, et al. discloses a disk drive having cover assembly which compresses a foam member between substantially planar rigid members. The top cover of the disk drive is a planer rigid plate made from stainless steel or aluminum and is not indicated to be made from injection molded polymer. A gasket is placed in between the planar rigid member of the top cover and the planar rigid member of the base and is secured after compressing to a third of its thickness by screws providing vibration absorption. The gasket loading uniformity is not an issue since both the top cover and base are planar rigid members.

U.S. Pat. No. 7,000,309 to Klassen, et al. discloses a method of assembling a disk drive by electrically grounding a disk drive cover. The method of assembling a disk drive includes providing a disk drive base, providing a disk drive cover having an inside face and an outside face. The inside face is coated with an electrically insulating material. The method further includes contacting, continuously during a period, the outside face with an electrically conductive grounding element that is part of an assembly fixture that is not part of the disk drive being assembled. The disk drive cover is made from a metal or conductive plastic. The '309 patent is concerned with providing insulating layers between conductive plates and grounding the outer portion of the conductive top plate. The '309 patent does not address problems of gasket sealing when a low modulus polymeric material is injection molded to create a low cost top cover.

U.S. Pat. No. 7,082,011 to Nakamura discloses a recording medium drive capable of preventing flexure of base and cover. A cover is received on the receiving surface of a base in a recording medium drive. A fastening mechanism serves to couple the cover to the receiving surface. An elastic member is interposed between the receiving surface and the cover. The elastic member is located along the occupied space of the fastening mechanism. The elastic member thus continuously surrounds the occupied space. A compressible gasket material continuously surrounds a screw fastening location thereby exerting uniform forces around the fastening screw preventing bending deformation of the top plate or the bottom base. The deformable gasket also extends between the screws that secure the top cover to the base and the bending of the top cover between the screws will result in leakage. The top cover is not indicated to be an injection molded polymer.

U.S. Pat. No. 7,292,406 to Huang discloses a disk drive including a spindle motor and a pivot bearing cartridge attached to different layers of a laminated cover. The laminated top cover that carries the spindle and the cartridge is not an injection molded polymeric part.

U.S. Pat. No. 7,301,725 to Kim, et al. discloses a disk drive with cover plate having high stiffness. The disk drive comprises a cover plate with preload tension formed across the cover plate for increasing the stiffness of the cover plate. The preload tension is formed across the cover plate after the cover plate that was warped is secured to a base member of the disk drive to become un-warped. Such a cover plate with increased stiffness is not easily deformed and effectively minimizes propagation of noise generated from operation of the disk drive. The top cover plate is made from a high stiffness metal such as stainless steel and is twisted in the pre-loaded condition. Securing this twisted top cover to a flat base results in pre-defined stresses that are indicated to improve sealing at the gaskets. The top cover is not made from an injection molded plastic material.

U.S. Pat. No. 7,385,784 to Berding, et al. discloses a disk drive cover with top and bottom layers electrically grounded with first and second flaps and method of manufacturing the same. The top cover has a top metallic plate, a bottom metallic plate and a viscoelastic material sandwiched between the top and bottom metal layers. Each of the top and bottom metallic plates is provided with tabs for grounding the cover plate. The top cover of the disc drive is not made from an injection molded plastic material.

U.S. Pat. No. 7,420,771 to Hanke, et al. discloses a disk drive with cover including a metal layer and a polymer layer with a polymer layer feature. The top cover of the disk drive has a metal layer and a polymer layer, which may be made from a plurality of individual polymer layers defining cavities. The metallic or polymer layer of the top cover contacts the base of the hard drive. The top cover has continuous metallic sheet and does not provide selective reinforcement of the polymer layers. The top cover is not an injection molded polymeric material with selective reinforcement.

U.S. Pat. No. 7,428,122 to Kimura, et al. discloses a hermetically sealed disk drive with low height. An assembly structure low in height and suitable for downsizing and for high hermeticity sealing in a micro hard disk drive is provided. Burrings projecting toward a top cover and having an internal thread cut are formed on a base plate where the top cover is screw-fastened to the base plate. The top cover is a flat sheet with burrings that are adopted for insertion into the base and secured by screws. The cover is not indicated to be an injection molded top cover.

U.S. Pat. No. 7,450,338 to Hur discloses a hard disk drive cover with protruding blades for reducing disk and HGA vibration. The cover of the hard disk drive has a blades protruding from a surface of the base and/or a portion of the cover facing the disk. The blade guides an airflow caused by rotation of the disk toward an outer edge of the disk. The top cover of the hard disc is not an injection molded polymeric component.

Thus, there remains a need for low cost injection molded top cover for hard drives with a reliable leak proof long life seal at top cover flange eliminating viscoelastic relaxation of the polymeric injection molded top cover flange.

SUMMARY

Generally, The invention is directed to a low cost high performance injection molded hard disk top cover that provides superior sealing properties at the seal locations preventing contamination of disk drive by moisture, gases as Oxygen or ambient dust particles. The plastic top cover does not resonate easily by spindle vibrations due to its low mass and low elastic modulus. The mass of the top cover is of importance since almost all the acoustic energy is airborne which means that the transmission loss of the acoustic energy through the top cover is very important and is mostly a function of mass. Damping does not do much for transmission loss. The disk drive with a plurality of disks has more airborne noise and the more important is the use of a high mass cover. Smaller dampers are also less functional since the noise simply goes around the sides of the small damper. The top cover of the present invention has a low mass top cover with the insertion injection molded metallic strip at the flange. The flange thus becomes the large mass portion of the hard drive top cover and the vibrational energy transmitted to the flange is delivered to the damping elastpmeic gasket. The low elastic modulus in combination with viscoelastic flow properties of the polymer without insertion molded metallic portion generally results in relaxation of stresses applied to a seal ring and the seal quality could degrade as a function of time. The present invention incorporates a insertion injection molded metallic strip in between screwed in locations of the top cover that assures adequate loading applied to the seals without viscoelastic creep relaxation of the polymeric top cover flange.

The present invention provides a low cost highly reliable hard drive top cover that is a polymeric injection molded cover portion. The flange portion of the polymeric top cover has one or more metallic portion insertion injection molded providing stiffness to the flange especially between screwed in securing locations so that adequate contact pressure is applied to the seal element therein preventing any leakage or ingress of dirt into the critical components of the hard drive. The presence of metallic portions between the screwed in retaining locations assuring non relaxing nearly uniform contact pressure over the seal element during the lifetime of the assembled hard drive device. This contact pressure of seal element is typically accomplished by threaded screws inserted through several clearance holes in the hard drive top cover plate and the threads of the screws engage with corresponding threaded apertures in the base plate at the bottom portion of the hard drive. Other fastening mechanisms may be used to apply required contact pressure on the seal elements such as clamps and the like.

In a preferred second embodiment, the insertion injection molded metallic portion that spans between the screwed in locations may be provided with a convex curvature so as to apply increased pressure at locations between the bolt securing locations. The clamping pressure generated in these locations between screwed in locations is comparable to that exerted directly at the screwed in securing locations. The injection molded polymer surrounding the curved metallic portion may also have a curved shape that mimics the shape of the curved metallic portion in the unstressed state, so that the application of the contact pressure by the screws result in straightening of both the metallic portion and the polymeric portion at the same time.

The injection molded top cover has a flange with metallic reinforcement portion and is subject to separation or delamination when the screws securing the top cover of the hard drive to the hard drive base portion is tightened. The third embodiment uses reinforcing metallic portion provided with a plurality of punched in apertures that provide pathways for the injection molded polymer. This attachment between the reinforcing metallic portion and the polymeric portion of the flange preventing the possibility of delamination of the metallic reinforcing portion even under extreme bending situations.

Preferably, the injection molded top cover of the hard drive is metalized by means including metal evaporation or electroless metal plating and grounded to the base member of the hard drive to guard the hard drive components against static electricity or electro magnetic interference. The screwed in attachment of the metalized top cover to the metallic base member of the hard drive grounds any electrical charge accumulated by the top plate.

Accordingly, the first embodiment of the present invention is directed to a low cost injection molded top cover article for a hard drive, comprising:
  an injection molded top cover of the hard drive having a body that encases the hard drive mechanism and a flange portion that surrounds the body portion;
  said flange portion having plurality of apertures for receiving screws that attach said top cover to the base member of the hard drive;
  said flange portion being reinforced by one or more metallic portions embedded within the injection molded polymer and reinforces the flange span between said apertures;
  said reinforcement preventing contact pressure loss on seal element between screwed in securing locations.

Accordingly, the second embodiment of the present invention is directed to a low cost injection molded top cover article for a hard drive, comprising:
  an injection molded top cover of the hard drive having a body that encases the hard drive mechanism and a flange portion that surrounds the body portion;
  said flange portion having plurality of apertures for receiving screws that attach said top cover to the base member of the hard drive;
  said flange portion being reinforced by one or more convex shaped metallic portions embedded within the injection molded polymer and reinforces the flange span between said apertures;
  said reinforcement preventing contact pressure loss on seal element between screwed in securing locations due to the curvature in mid span between screwed in locations applying increased contact pressure.

Accordingly, the third embodiment of the present invention is directed to a low cost injection molded top cover article for a hard drive, comprising:
  an injection molded top cover of the hard drive having a body that encases the hard drive mechanism and a flange portion that surrounds the body portion;
  said flange portion having plurality of apertures for receiving screws that attach said top cover to the base member of the hard drive;
  said flange portion being reinforced by one or more metallic portions provided with plurality of apertures for passage and bond creation between injection molded polymer and said metallic portion;
  said reinforced flange span between said apertures preventing contact pressure loss on seal element between screwed in securing locations.

The metallic reinforcing portion embedded may take the form of a continuous ring shaped element or may be plurality of individual strips, each spanning within the flange the distance between adjacent screwed in locations. Since the bending moment is highest in the mid span and is lowest at the screwed in locations, the plurality of reinforcing metallic portions need not necessarily pass through apertures provided in the top cover flange for screwed attachment of the top cover to the base portion of the hard drive.

BRIEF DESCRIPTION OF THE DRAWINGS

The invention will be more fully understood and further advantages will become apparent when reference is made to the following detailed description of the preferred embodiments of the invention and the accompanying drawings, in which.

DETAILED DESCRIPTION

Hard drives use a top cover and a seal to close and contain the contents of a hard drive isolated from ambient dust, gases and moisture. Commercial top covers for hard drives are made from stamped, cast or forged and machined metallic parts. Common metals used for hard drive top covers include stainless steel or aluminum, which meet corrosion requirement. The corrosion resistance may be additionally improved by means of an applied coating. The hard drive top cover needs to meet several critical functional requirements. Since the top cover is held secure against the base portion of the hard drive screws which also apply required sealing pressure on the gasket material used. Any deformation of the top cover or the vase portion securing portions leads to relaxation of the sealing pressure leading to leakage of ambient moisture, gases and foreign particles into the interior of the hard drive. The magnetic disks of the hard drive rotate at high speeds and an air current is established around the spinning disks and the vibration energy is transferred to the top cover of the hard drive, depending on the mass of the top cover. General wisdom on the industry is to use heavier mass top covers when several spinning disks are present in the magnetic disk stack. The coupled vibration energy needs to be attenuated or discharged in some manner preventing excessive build up vibrational amplitudes. This vibration energy transfer also is controlled by the elastic modulus of the top cover of the hard drive. Generally, a low mass low modulus top cover will have vibration frequencies far removed from that of the spinning magnetic disks and will not couple readily.

Before describing several exemplary embodiments of the invention, it is to be understood that the invention is not limited to the details of construction or process steps set forth in the following description. The invention is capable of other embodiments and of being practiced or being carried out in various ways.

This invention relates in the first embodiment to a low cost high performance injection molded hard disk top cover comprising a polymeric injection molded top cover, the flange of which is reinforced with a metallic strip that is inserted within the polymeric portion of the flange during insertion injection molding. In the absence of this metallic strip, the flange portion will viscoelastically relax in the spaces between the screwed in gasket securing locations relaxing the pressure applied to the gasket, thereby causing a leak of ambient moisture or dust into the interior of the hard disk resulting in premature disk failure.

The second embodiment of the invention relates to providing a convex curvature to the metallic strip between the screwed in gasket securing locations. When the threaded screws are used to attach the top cover to the base portion of the hard drive, the convex curvature of the metallic strip applies increased pressure on the gasket and this curvature may be designed to apply this pressure between the screwed in locations to be nearly the same as that directly surrounding the screwed in locations. Since this pressure applied is minimally controlled by the adjacent injection molded polymer (which only bears a small portion of the sealing pressure and therefore relaxes very little) the pressure applied to the gasket is reliably maintained during the life period of the hard drive. The polymeric portion surrounding the metallic strip may also follow the convex shape contour of the metallic strip.

The third embodiment addresses the issues related to the separation of the injection molded polymer from the adjacent metallic strip in the flange portion of the top cover during the application of bending loads. The metallic strip flat or convex contoured may be provided with plurality of apertures through which the injection molded polymer may pass through creating rivet like securing features. The presence of these structural features prevents delamination of the metallic strip from the adjacent injection molded polymer during assembly and use of the hard drive.

The injection molding process is quite inexpensive and produces near net shape articles rapidly with extreme precision. The process may use thermoplastic polymers or thermoset polymers, which may be filled or unfilled with fillers. The preferred polymers for the top cover of hard drive are Lexan EXL resin (available from Sabic innovative plastic. one plastics avenue, Pittsfield, Mass. 01201) or VECTRA (available from Hoechst Celanese Corp. CHARLOTTE, N.C.). The process of insertion injection molding uses an inserted metallic strip in the flange portion of the top cover mold during injection molding.

Due to the low mass of the top cover, the vibrational coupling between the air currents surrounding the rotating magnetic disk media and the top cover are minimized. In addition, the largest mass is contained in the metallic strip embedded in the flange, which transmits the vibration energy to the base portion through the elastomeric gasket, which attenuates the vibrations due to its viscoelastic properties.

Since the top cover is a polymer, it is electrically insulating. The top and bottom surfaces of the top cover may be metalized by metal evaporation, electroless plating or other suitable means and may be connected electrically to the base providing ESD and EMI shielding.

Figure 1:
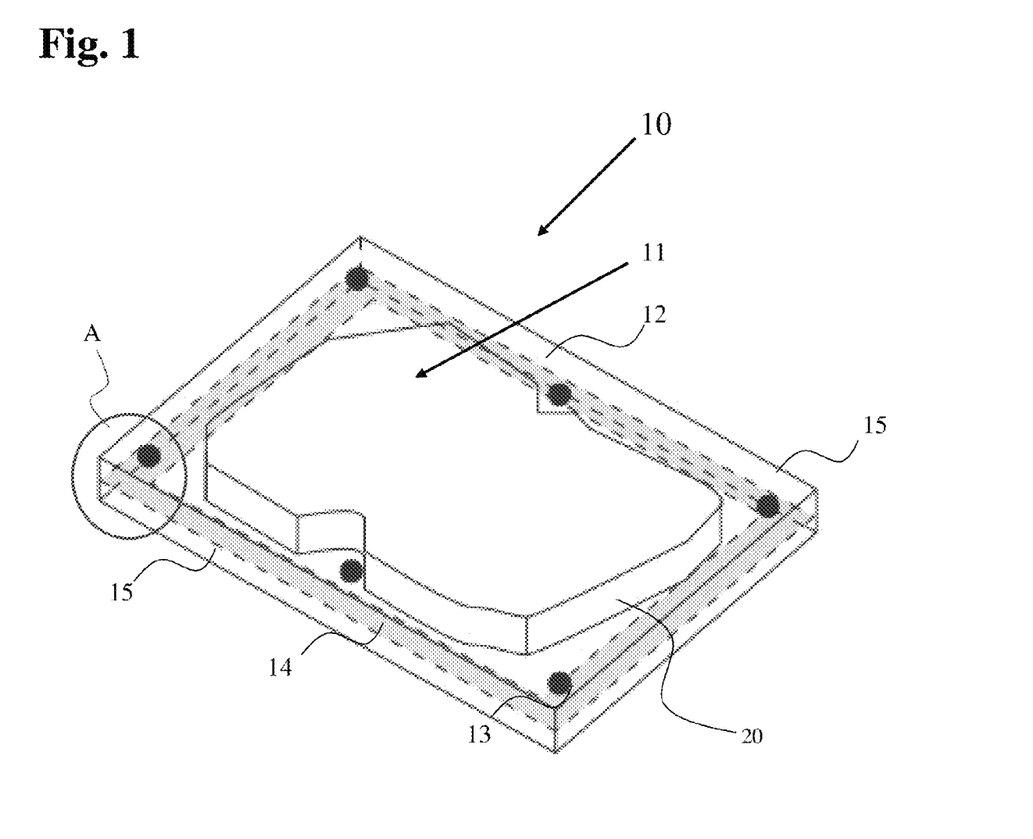
FIG. 1 illustrates a schematic overview of the low cost injection molded hard drive top cover with a continuous metallic reinforcement in the flange portion.

FIG. 1 schematically illustrates at 10 a low cost injection molded top cover 11 for a hard drive having a body 20 according to the first embodiment of the invention. The top cover 11 has a flange portion 12 which contacts a corresponding flange in the base portion (not shown) entrapping a gasket element which is compressed by a plurality of threaded screws inserted through apertures 13 in the flange 12 of the top cover. The flange 12 has a metallic strip 14 embedded within the polymeric portion 15 as shown and the presence of the metallic strip provides adequate sealing pressure to the gasket between the screw locations preventing any leakage of ambient moisture or dust. The metallic strip reinforcing the flange shown in this figure is a continuous strip.

Figure 2:
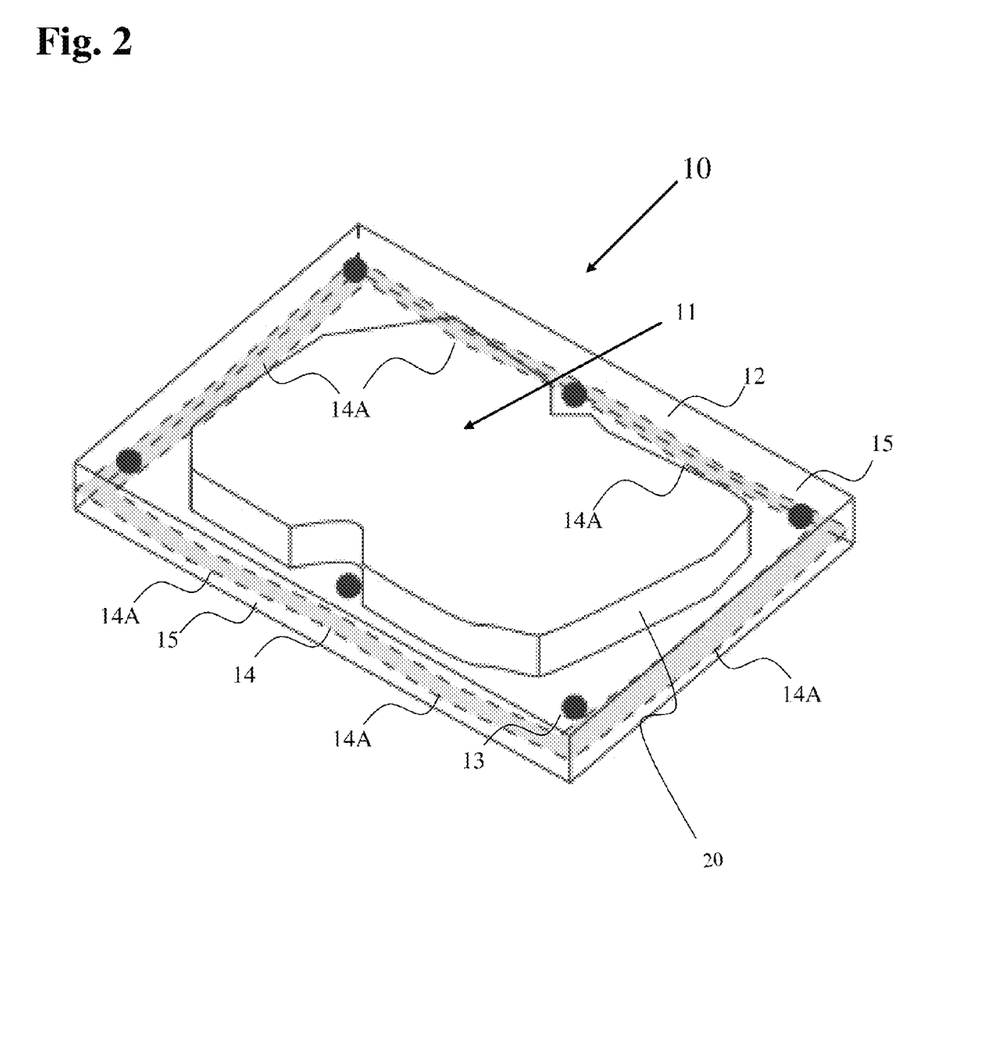
FIG. 2 illustrates a schematic overview of the low cost injection molded hard drive top cover with a continuous metallic reinforcement with convex curvature between screwed in locations in the flange portion.

FIG. 2 schematically illustrates at 10 a low cost injection molded top cover 11 for a hard drive having a body 20 according to the second embodiment of the invention. The top cover 11 has a flange portion 12 which contacts a flat flange in the base portion (not shown) entrapping a gasket element which is compressed by a plurality of threaded screws inserted through apertures 13 in the flange 12 of the top cover. The flange 12 has a convex contoured metallic strip 14 embedded within the polymeric portion 15 as shown. The convex contour that is present between the apertures 13 at 14A provides additional pressurization on the gasket as the screws inserted through apertures 13 are tightened. The presence of the continuous metallic strip provides adequate sealing pressure to the gasket between the screw locations preventing any leakage of ambient moisture or dust. The metallic strip reinforcing the flange shown in this figure is a continuous strip.

Figure 3:
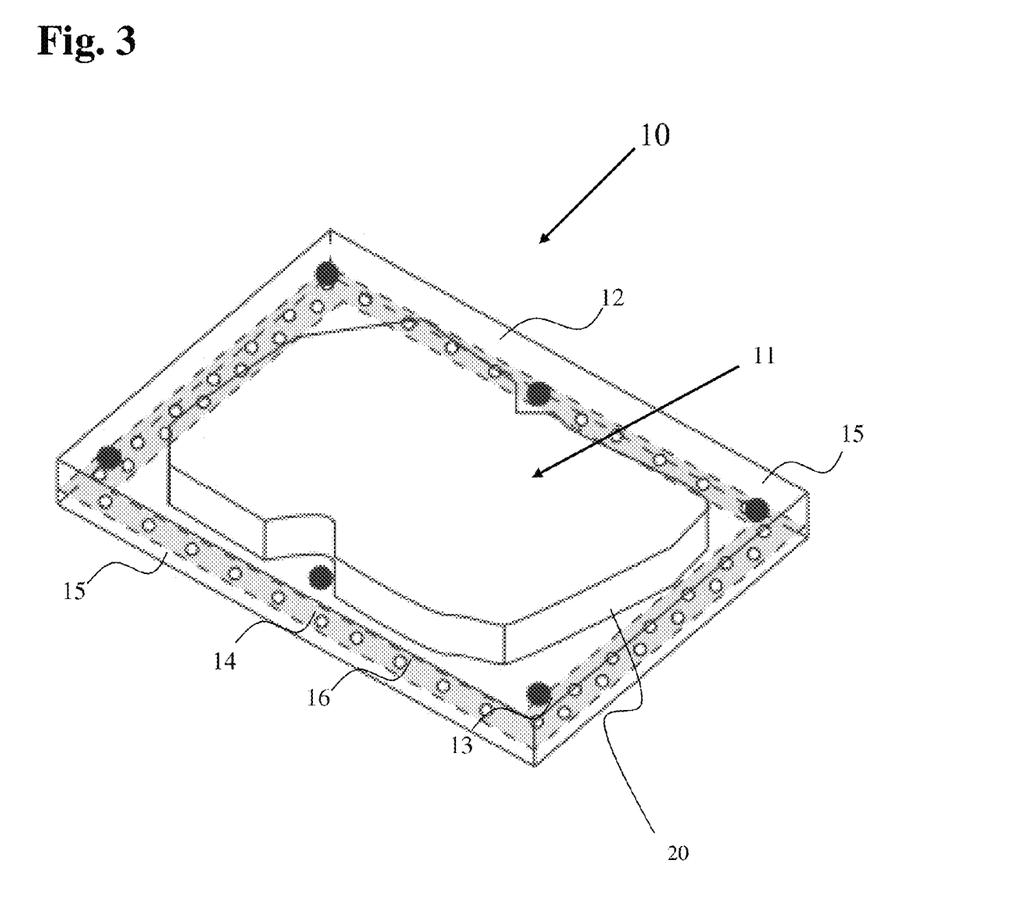
FIG. 3 illustrates a schematic overview of the low cost injection molded hard drive top cover with a continuous metallic reinforcement that has pathways for intimate polymeric resin bond in the flange portion.

FIG. 3 schematically illustrates at 10 a low cost injection molded top cover 11 for a hard drive having a body 20 according to the third embodiment of the invention. The top cover 11 has a flange portion 12 which contacts a corresponding flange in the base portion (not shown) entrapping a gasket element which is compressed by a plurality of threaded screws inserted through apertures 13 in the flange 12 of the top cover. The flange 12 has a metallic strip 14 embedded within the polymeric portion 15 as shown. The metallic strip 14 has a plurality of apertures 16 providing interconnections of the polymeric portion 15 preventing delamination of the metallic strip from the surrounding injection molded polymer. The presence of the metallic strip provides adequate sealing pressure to the gasket between the screw locations preventing any leakage of ambient moisture or dust. The metallic strip reinforcing the flange shown in this figure is a continuous strip.

Figure 4:
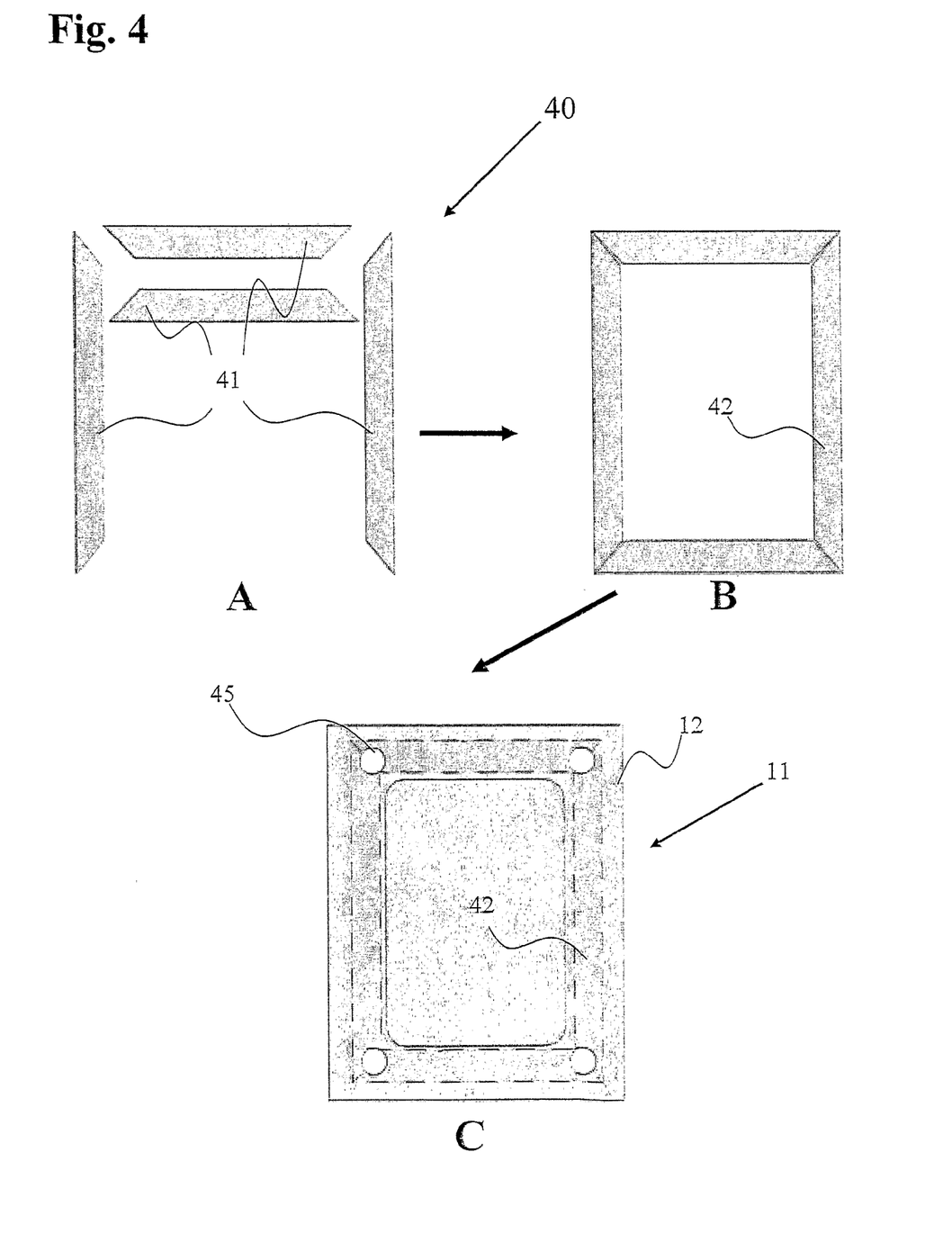
FIG. 4 illustrates a schematic overview of assembly procedure for a low cost injection molded hard drive top cover with a discontinuous metallic reinforcement in the flange portion.

FIG. 4 schematically illustrates at 40 the assembly procedure of a low cost injection molded top cover 11 for a hard drive according to an embodiment of the invention using discontinuous strips. Figure A shows at 41 four strips of reinforcement metal. In Figure B, the four strips are assembled to form a rectangular reinforcement structure 42. The assembled reinforcement metallic piece is transferred to a polymer injection molding machine as shown at C to mold the top cover for the hard drive 11. The top cover 11 has a flange portion 12 which contacts a corresponding flange in the base portion (not shown) entrapping a gasket element which is compressed by a plurality of threaded screws inserted through apertures 45 in the flange 12 of the top cover that may be produced during injection molding or produced by drilling after insertion injection molding. The flange 12 has a metallic strip embedded within the polymeric portion as shown between the screwed in attachment locations.

Figure 5:
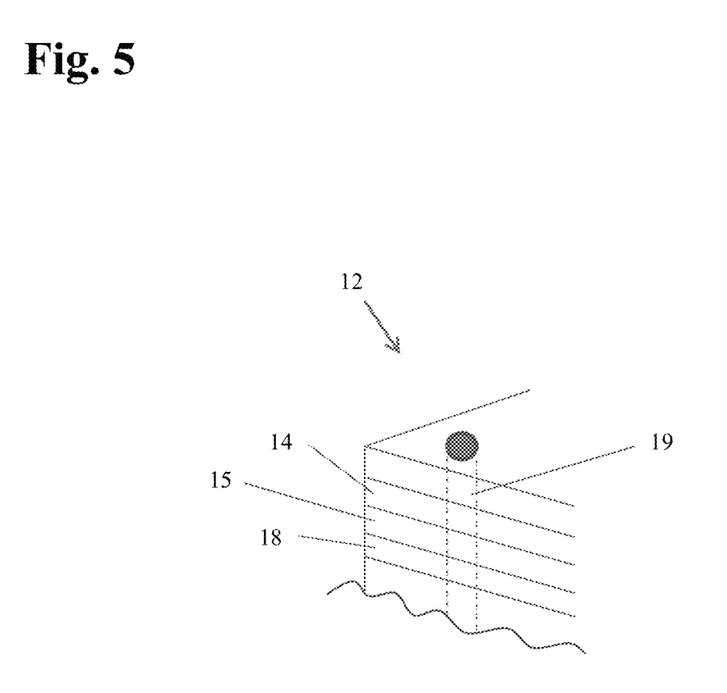
FIG. 5 illustrates a schematic blown up view of Circle A in FIG. 1 showing the flange portion.

FIG. 5 schematically illustrates a blown up view of Circle A in FIG. 1 showing flange portion 12. Flange portion 12 contacts a corresponding flange in the base portion (not shown) entrapping a gasket element 18 which is compressed by a threaded screw 19. Flange portion 12 has a metallic strip 14 embedded within the polymeric portion 15.

The Low cost high performance injection molded hard disk top cover of the subject invention comprises, in combination, the following salient features:

A hard drive cover having a flanged top cover portion squeezing a rubber or polymeric gasket between the flange of the top cover portion and the hard drive bottom portion by pressure application means protecting interior components of the hard drive from moisture, gases or ambient dust;

said pressure application means selected from plurality of threaded screw connections or clamping means;

said top cover portion is an insertion injection molded component with a continuous metallic strip incorporated during injection molding in said flange portion of the injection molded top cover of the hard drive;

said injection molding polymer including Lexan EXL, VECTRA or other suitable injection molding polymers;

In a second embodiment, said continuous metallic strip has a convex curvature between apertures provided for the insertion of said threaded screw connections and the injection molded top cover flange also having a corresponding convex curvature;

said convex curvature applying increased pressure on the said rubber or polymeric gasket in between said threaded screw connections;

In a third embodiment, said continuous metallic strip has a plurality of apertures providing pathways for injection molded polymer said apertures increasing the adhesion between the injection molded polymer and the metallic strip preventing delamination there between when clamping load is applied between said flanges;

Whereby adequate pressure on the gasket is maintained between threaded screw connections preventing leakage of ambient moisture or dust into the interior of the hard drive.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A hard drive comprising:
an injection molded polymeric top cover ;
the top cover comprising a body portion encasing a hard drive mechanism and a flange portion;
said flange portion contacting an elastomeric seal element squeezed against a corresponding flange on each side edge of a base member of the hard drive by a plurality of pressure application means;
said flange portion having an injection molded polymer and a convex shape contour metallic reinforcement portion embedded within said injection molded polymer and extended along a longitudinal direction of said flange portion such that vibrational energy is transmitted to the elastomeric seal element, said metallic reinforcement portion having a plurality of apertures for passage of said injection molded polymer to create rivet-like securing features, thereby preventing delamination of the metallic reinforcement portion from adjacent injection molded polymer during pressure application to the elastomeric seal element;
whereby the pressure on said elastomeric seal element is maintained without viscoelastic relaxation of the flange portion.

2. The hard drive of claim 1, wherein the pressure application means is a plurality of threaded screw connections.

3. The hard drive of claim 1, wherein the pressure application means is a plurality of clamps.

4. The hard drive of claim 1, wherein the top cover is injection molded with a polymer selected from Lexan EXL, VECTRA or other suitable injection molding polymers.

5. The hard drive of claim 1, wherein said metallic reinforcement portion is a continuous strip.

6. The hard drive of claim 1, wherein said metallic reinforcement portion is a plurality of discrete reinforcement strips.

7. The hard drive of claim 1, wherein said metallic reinforcement portion has a convex curvature between pressure application locations thereby applying increased contact pressure on said elastomeric seal element.

8. The hard drive of claim 1, wherein said top cover has a metalized coating preventing static accumulation providing EMI and ESD shielding.

9. The hard drive of claim 8, wherein said metalized coating is an electroplated coating, an electroless plated coating or an evaporated metal coating.

* * * * *